United States Patent [19]
Keiser

[11] Patent Number: 5,526,692
[45] Date of Patent: Jun. 18, 1996

[54] SENSOR

[75] Inventor: Dennis L. Keiser, Sanger, Calif.

[73] Assignee: Keiser Corporation, Fresno, Calif.

[21] Appl. No.: 175,146

[22] Filed: Dec. 29, 1993

[51] Int. Cl.$^6$ .................................................. G01L 9/00
[52] U.S. Cl. ............................................ 73/715; 73/723
[58] Field of Search .................... 73/719, 717, 861.47, 73/861.61, 279, 262, 720, 721, 726, 727, 275, 276, 861.58, 715

[56] References Cited

U.S. PATENT DOCUMENTS

| | | | |
|---|---|---|---|
| 3,058,350 | 10/1962 | Brown | 73/719 |
| 4,221,134 | 9/1980 | Ekstrom, Jr. | 73/861.47 |
| 4,254,731 | 3/1981 | Taylor | 73/709 |
| 4,257,593 | 3/1981 | Keiser . | |
| 4,309,908 | 1/1982 | Rapp et al. | 73/720 |
| 4,369,728 | 1/1983 | Nelson | 73/709 |
| 4,572,000 | 2/1986 | Kooiman . | |
| 4,624,137 | 11/1986 | Johnson et al. | 73/204.26 |
| 4,701,742 | 10/1987 | Ruehr | 73/717 |
| 4,974,117 | 11/1990 | Irwin . | |
| 5,020,377 | 6/1991 | Park . | |
| 5,029,479 | 7/1991 | Bryan . | |
| 5,035,137 | 7/1991 | Burkard et al. . | |
| 5,079,953 | 1/1992 | Martin et al. . | |
| 5,090,247 | 2/1992 | Leibgen . | |
| 5,155,653 | 10/1992 | Kremidas . | |
| 5,157,973 | 10/1992 | Ciminelli . | |
| 5,317,917 | 6/1994 | Dufour | 73/717 |

OTHER PUBLICATIONS

Brochure entitled, "Keiser—We've Just Made Quality More Affordable", pp. 9 & 10, Discover The Advantages Of Air Superiority, Keiser.

FSR Integration Guide and Standard Parts Catalog, entitled, "Force Sensing Resistors Standard Parts Catalog Descriptions and Dimensions", p. 7, Interlink Electronics.

*Primary Examiner*—Richard Chilcot
*Assistant Examiner*—Ronald Biegel
*Attorney, Agent, or Firm*—Worrel & Worrel

[57] ABSTRACT

A sensor having a housing enclosing a passage adapted to be connected to a source of fluid in fluid receiving relation; a member mounted in the housing communicating with the passage in position to be moved upon the application of a fluid pressure differential thereacross; and a system for registering the movement of the member to detect the fluid pressure differential.

26 Claims, 4 Drawing Sheets

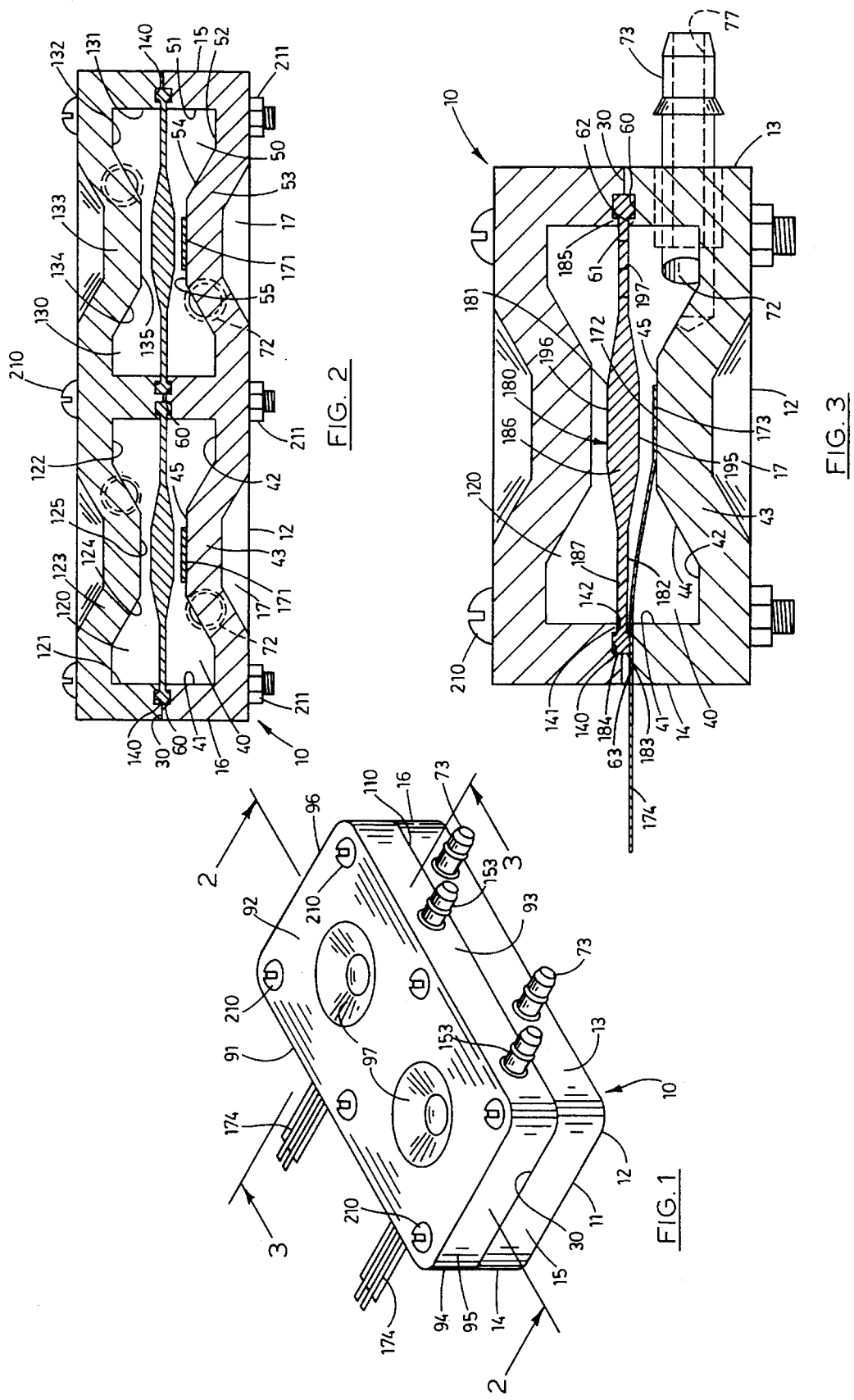

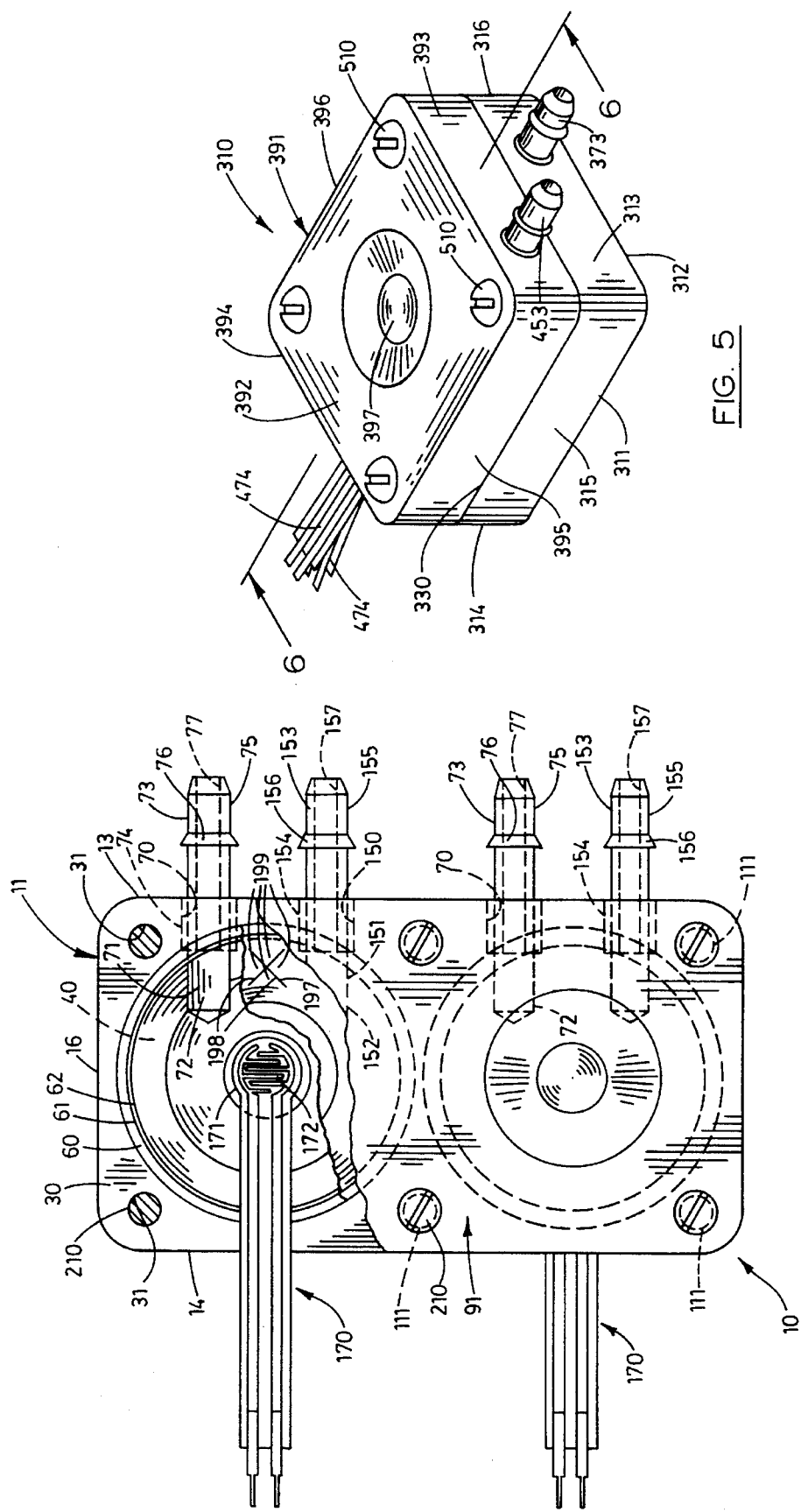

5,526,692

SENSOR

BACKGROUND OF THE INVENTION

1. Field of the Invention

The present invention relates to a sensor and, more particularly, to such a sensor which is operable to detect predetermined phenomena in a wide variety of operative environments.

2. Description of the Prior Art

The accessibility of information is critical to a host of disciplines. More broadly, the rapid and accurate availability of data controls our ability to perform the most complex scientific experiments, at one end of the spectrum, to the most menial of daily tasks, at the other end of the spectrum. Thus, for example, both space exploration and the operation of a motor vehicle are dependent for their success upon the rapid and accurate availability of data.

As a consequence, the prior art is replete with sensors for registering a wide variety of physical phenomena for a diverse multitude of operative environments. While, to varying degrees, such prior art sensors are successful in achieving their operational objectives, the complexity and, therefore, the expense of such sensors is frequently prohibitive, or otherwise impractical for many prospective environments of usage.

Furthermore, there are enumerable environments in which it is necessary, or desirable, to have data immediately accessible of a variety of types and from a variety of sources. Heretofore this has required that individual sensors be provided for the respective types of data. The multiplication of the expense associated therewith is frequently directly correlated with the numbers of types of data involved. Where the environments involve products which must be sold competitively with other products designed for the same purpose, even marginal savings in expense are of enormous importance when considered in relation to the numbers of such products sold. Where the savings is more substantial on a per unit basis, the benefit may be enormous considered as to an entire line of products.

For example, in the operation of any product having a fluid system, whether liquid, gas or another fluid, the rapid and accurate accessibility of data relative thereto is of critical importance. One environment illustrative of this fact, from a multitude of such environments, is in respect to exercising machines which use a fluid resistance force. More particularly, the applicant's invention and development of pneumatic exercising machines, such as that of U.S. Pat. No. 4,257,593, has provided an entirely new capability. The use of pneumatic exercising machines affords a multiplicity of advantages for both professional and amateur athletic programs, as well as individual users. The rapidity and accuracy with which data relative to such fluid resistance systems is accessible is directly related to the utility of such exercising machines. While an impressive array of sensors may be available for registering and therefore providing the data necessary for this purpose, the complexity and expense, as well as the multiplicity of such sensors required, may obviate their utility, particularly in the case of exercising machines sold competitively in the lower price ranges of the market.

Therefore, it has long been known that it would be desirable to have a sensor which rapidly and accurately provides desired data; which can be employed to provide, in a continuous mode of operation, data of a plurality of types; which, while providing the detailed data desired, continuously so performs at significantly less expense than has heretofore been possible with prior art sensors; which is virtually universally adaptable to a host of different operative environments to perform its operational objectives while, in all cases, being of significantly less expense than prior art sensors; which is readily adaptable for performance in accordance with the criteria required for this specific environment of usage; and which is particularly well suited to registering and providing data for exercising machines, particularly of the pneumatic type.

SUMMARY OF THE INVENTION

Therefore, it is an object of the present invention to provide an improved sensor.

Another object is to provide such a sensor which is operable to detect even the smallest pressure differential.

Another object is to provide such a sensor which has application to a multifarious number of operative environments wherein data is required for practical operation.

Another object is to provide such a sensor which significantly reduces the cost associated with registering and providing data necessary for the performance of operational objectives within any particular operative environment.

Another object is to provide such a sensor which is adaptable for registering data of a plurality of types at minimal expense.

Another object is to provide such a sensor which is readily manufactured, at minimal cost, affording a substantially fungible product, adapted for usage in registering data relative to virtually any fluid system.

Another object is to provide such a sensor which is entirely dependable over a long operational life in detecting the phenomena desired and reporting the data in a form immediately accessible and required for use in the particular operative environment of application.

Another object is to provide such a sensor which is uniquely well suited to operation in exercising machines employing a fluid medium as the resistance force.

Another object is to provide such a sensor which is uniquely well suited to use in exercising machines employing a pneumatic resistance force and which is operable to detect the direction of fluid flow, the force of fluid flow and the rate of fluid flow on a continuously operational basis, all at a cost significantly below that heretofore possible with sensors of the conventional types.

Further objects and advantages are to provide improved elements and arrangements thereof in an apparatus for the purpose described which is dependable, economical, durable and fully effective in accomplishing its intended purpose.

BRIEF DESCRIPTION OF THE DRAWINGS

FIG. 1 is a perspective view of a first preferred embodiment of the sensor of the present invention.

FIG. 2 is a somewhat enlarged, longitudinal vertical section taken on line 2—2 in FIG. 1.

FIG. 3 is a somewhat further enlarged, transverse vertical section taken on line 3—3 in FIG. 1.

FIG. 4 is a fragmentary top plan view of the sensor of FIG. 1.

FIG. 5 is a perspective view of a second embodiment of the sensor of the present invention.

DESCRIPTION OF THE PREFERRED EMBODIMENTS

FIRST EMBODIMENT

Figure 6:
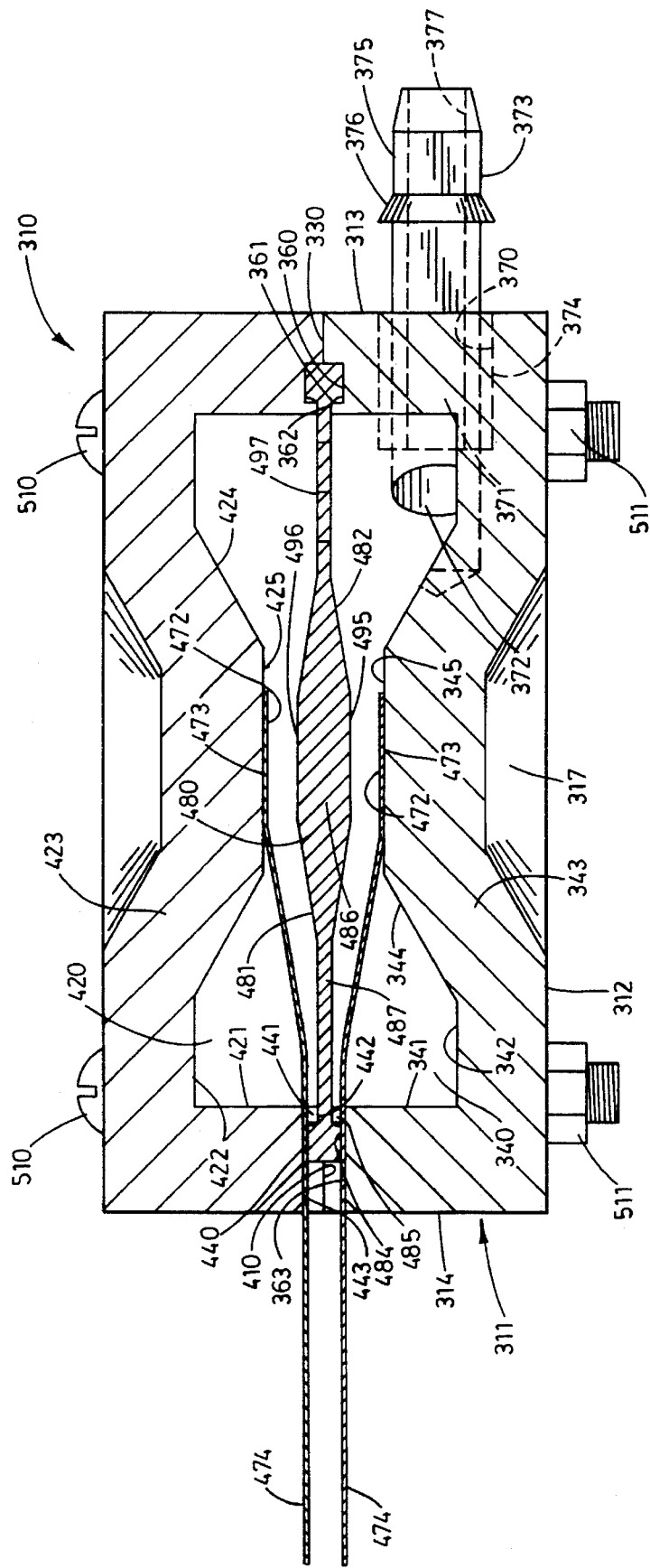
FIG. 6 is a somewhat enlarged, transverse vertical section taken on line 6—6 in FIG. 5.

Referring more particularly to the drawings, the sensor of the present invention is generally indicated by the numeral 10 in FIG. 1. The sensor can be manufactured in a variety of different forms and from a variety of materials including metal, plastic or any other suitable material. For purposes of illustrative convenience, it will be understood that the sensor 10 in the preferred embodiment is constructed of a suitable molded plastic material.

The sensor has a first or lower housing 11 having, except as otherwise noted, a flat lower surface 12 with a front surface 13 right-angularly related to the lower surface. The lower housing has a back surface 14 substantially parallel to the front surface. As shown in FIG. 1, the lower housing has a left end surface 15 and an opposite, substantially parallel right end surface 16. A pair of frusto-conical depressions 17 extend inwardly of the lower surface 12, as best shown in FIG. 2.

The lower housing 11 has a parting or upper surface 30 defining a plane parallel with the lower surface 12 of the lower housing. A plurality of bore holes 31 extend through the lower housing from the upper surface 30 through the lower surface 12 along individual axes right-angularly related to the plane defined by the upper surface. In this case, six such bore holes are provided in the pattern which may best be visualized in FIGS. 1 and 4.

The lower housing 11 has a first subchamber 40 on the left, as viewed in FIG. 2. The first subchamber is defined by a cylindrical sidewall 41 concentric to an axis right-angularly related to the plane of the upper surface 30. The first subchamber has a lower surface 42 which, except as otherwise noted, is right-angularly related to the longitudinal axis of the cylindrical sidewall. A projection 43 extends upwardly from the lower surface concentric to the axis and having an upwardly convergent conical surface 44. The projection has a flat upper surface 45 parallel with the upper surface 30 of the lower housing.

A second subchamber 50 is contained within the lower housing 11 and is shown on the right, as viewed in FIG. 2. The second subchamber is defined by a cylindrical sidewall 51 concentric to a longitudinal axis parallel with the longitudinal axis of the cylindrical sidewall 41 of the first subchamber 40. The second subchamber has a lower surface 52, accept as otherwise noted, defining a plane parallel to the upper surface 30 of the lower housing 11. A projection 53 extends upwardly from the lower surface 52 and has a conical surface 54 concentric to the longitudinal axis of the cylindrical sidewall. The projection has a flat upper surface 55 parallel to the upper surface 30 of the lower housing.

As perhaps best shown in FIG. 4, the first and second subchambers 40 and 50, respectively, each have a recessed annulus 60 extending thereabout and extending into the upper surface 30 of the lower housing 11. Each recessed annulus is concentric to the longitudinal axis of the respective cylindrical sidewalls 41 and 51 of the respective first and second subchambers. Each recessed annulus is preferably substantially U-shaped in cross section bounded by a pair of substantially parallel surfaces and terminating in a lower surface right-angularly related to the side surfaces. Just inwardly of each recessed annulus and thereby separating each annulus from its respective subchamber is an annular ridge 61 concentric to the longitudinal axis of its respective cylindrical sidewall 41 or 51, respectively, and having an upper surface 62 defining a plane parallel to the upper surface 30 of the lower housing and recessed therefrom, as best shown in FIG. 3. A slot 63 of predetermined width is formed in and extends through the annular ridge 61, recessed annulus 60 and through the back surface 14 of the lower housing from each subchamber 40 and 50, as shown in FIG. 3. Thus, each subchamber of the lower housing is connected, by a shallow, narrow slot, with the exterior thereof to receive the structure hereinafter to be described.

A screw threaded bore 70 extends inwardly through the front surface 13 of the lower housing 11 and into both the first subchamber 40 and the second subchamber 50, thus extending respectively through the cylindrical sidewall 41 of the first subchamber and the cylindrical sidewall 51 of the second subchamber. The screw threaded bores 70 are offset relative to their respective first and second subchambers, as best shown in FIG. 4. Each of the screw threaded bores defines a passage 71 communicating with its respective first or second subchamber through an opening 72 having a smooth surface. A coupling 73 is mounted in each of the screw threaded bores 70. Each coupling has an externally screw threaded end portion 74 which is individually screw-threadably received in its respective screw threaded bore 70 so as to be mounted therein in fluid tight relation. Each coupling has a conduit fastening portion 75 extending outwardly from the front surface 13 of the lower housing and is circumscribed by a radial ridge 76. Each coupling has a central passage 77 extending longitudinally entirely therethrough so as to establish communication between the interior of each respective subchamber and the exterior of the coupling through the passage 77 thereof.

The sensor 10 has a second or upper housing 91, also preferably, but not necessarily, constructed of a suitable molded plastic material. Additionally, preferably, although not necessarily, the upper housing is produced from the same mold as the lower housing 11 so that they are, except as otherwise noted, identical. Thus, the upper housing has an upper surface 92 which defines a flat plane, except as otherwise noted. The upper housing has a flat front surface 93 which is right-angularly related to the upper surface 92 and a back surface 94 which is also right-angularly related to the upper surface and parallel to the front surface. As depicted in FIG. 1, the upper housing has a left end surface 95, which is right-angularly related to the upper surface 92, and a right end surface 96, which is right-angularly related to the upper surface and parallel to the left end surface. A pair of depressions 97 are formed and extend into the upper surface 92, as best shown in FIG. 1.

The upper housing has a parting or lower surface 110 defining a plane parallel to the plane of the upper surface 92 thereof, except as otherwise noted. A plurality of bore holes extend through the upper surface 92 and through the lower surface 110 in the same pattern and of the same dimensions as the bore holes 31 of the lower housing 11.

Similarly, as with the lower housing 11, the upper housing 91 has a first subchamber 120 on the left, as viewed in FIG. 2. The first subchamber is defined by cylindrical sidewall 221 concentric to a longitudinal axis right-angularly related to the plane defined by the upper surface 92. The first subchamber has an upper surface 122 which is right-angularly related to the axis defined by the cylindrical sidewall. A projection 123 extends downwardly from the upper surface concentric to the longitudinal axis of the cylindrical sidewall and having a conical surface 124 circumscribing the longitudinal axis. The projection has a flat upper surface 125 right-angularly related to the longitudinal axis described by the cylindrical sidewall 121.

The upper housing 91 has a second subchamber 130 on the right, as viewed in FIG. 2. The second subchamber is defined by a cylindrical sidewall 130 concentric to a longitudinal axis right-angularly related to the upper surface 92 of the upper housing. The second subchamber has an upper surface 132 which is right-angularly related to the longitudinal axis described by the cylindrical sidewall. A projection 133 extends downwardly from the upper surface concentric to the longitudinal axis described by the cylindrical sidewall and has a conical surface 134 concentric thereto. The projection has a flat lower surface 135 which is right-angularly related to the longitudinal axis of the cylindrical sidewall.

The first and second subchambers 120 and 130 are each individually bounded by a recessed annulus 140, identical to the recessed annuli 60 of the lower housing 11. Thus, each recessed annulus is described in cross section by a pair of parallel side surfaces terminating in a lower surface to describe a substantially U-shape. Between each of the recessed annuli and the respective first or second subchamber, is an annular ridge 141 having a lower surface 142 parallel to the lower surface 110 of the upper housing, but inwardly recessed therefrom.

A screw threaded bore 150 extends inwardly from the front wall 93 of the upper housing 91 and into communication with each of the first and second subchambers 120 and 130, respectively. As can be visualized in FIGS. 1, 2 and 4, the screw threaded bores 150 are offset relative to their respective first and second subchambers. Each of the screw threaded bores defines a passage 151 communicating with its respective subchamber through an opening 152. A coupling 153, having an externally screw threaded end portion 154 is screw-threadably received in the screw threaded bore by its externally screw threaded end portion to establish fluid tight engagement. Each of the couplings has a conduit fastening portion 155 extending outwardly from the front surface 93 of the upper housing and circumscribed by a radial ridge 156. Each coupling has a central passage 157 extending entirely therethrough so as to establish fluid communication between the exterior of the sensor through the central passage 157 and into communication with its respective first or second subchamber through the opening 152 thereof.

The sensor 10 has a pair of detectors, pressure sensitive switches, or force sensing resistors 170. In the preferred embodiment the force sensing resistor is one such as sold by Interlink Electronics and identified as part number "300 (⅕ inch circle)." However, a variety of detectors can be employed for this purpose. The detector 170 has a pad portion 171 having an upper surface 172 and a lower surface 173. The detector has an electrical conductor portion 174 extending therefrom, as best shown in FIG. 4. The detector, in the preferred embodiment a force sensing resistor as described, has the lower surface 173 thereof attached by any suitable means, such as adhesive, on the respective upper surfaces 45 and 55 of the respective projections 43 and 53, as best shown in FIG. 2. Thus, the upper surface 172 of each detector is deployed for contact as will hereinafter be described. Where, as in the preferred embodiment, the detector is the force sensing resistor described, pressure applied to the upper surface 172 causes a variation in electrical resistance across the electrical conductor portion 174 when connected to an electrical circuit, as will hereinafter be described in greater detail. The electrical conductor portions 174 of the detectors extend through their respective slots 63 extending from their respective first and second subchambers 40 and 50 outwardly through the back surface 14 of the lower housing 11. The slots are of a width just wide enough for the electrical conductor portions individually to fit therewithin.

The sensor 10 has a pressure responsive member or diaphragm 180 constructed of any suitable material such as a resilient rubber, any other suitable synthetic rubber, or material permitting it to flex in response to fluid pressure applied thereto, as will hereinafter be described in greater detail. The diaphragm has an upper surface 181 and an opposite lower surface 182. The diaphragm has a peripheral surface 183 of a cylindrical configuration. Immediately inwardly of the peripheral surface, the diaphragm has an annulus 184 extending entirely thereabout which, in cross section, is substantially square so as to form an inwardly facing shoulder 185. The diaphragm has a thickened central portion 186 concentric to the annulus 184 and connected to the annulus 184 by a web portion 187 of thinner, but solid material, except as hereinafter noted.

More specifically, the diaphragm 180 has a lower contact surface 195 of the thickened central portion 186 which is flat and parallel to the plane defined by the plane of the diaphragm. Similarly, the thickened central portion of the diaphragm has an upper contact surface 196 which is circular and is parallel to the lower contact surface 195. A passage or opening 197 is formed in the web portion 187 of the diaphragm by intersecting incisions or slits 198 visible in FIGS. 3 and 4. In the preferred embodiment, the opening is formed by the intersecting incisions. However, the opening can be formed in a variety of other configurations, preferably, although not necessarily, by incision. In the preferred embodiment, the incisions intersect at right angles relative to each other to define four flaps 199. The opening 197 of the diaphragm is formed by incision without the removal of material from the diaphragm. The diaphragm is formed from resilient material which has "memory" causing the flaps to remain closed, until a sufficient pressure differential is applied thereacross, as will hereinafter be discussed in greater detail. As will be seen, this causes the diaphragm, in effect, to operate as if it had no opening therein at low pressure differentials thereacross. Each diaphragm is mounted on the lower housing 11 by positioning of the annulus 184 of each diaphragm within its respective recessed annulus 60 of the lower housing so that the web portion 187 is rested on and extends over the upper surface 62 of its respective annular ridge 61 with the thickened central portion 186 of each diaphragm extending across its respective first or second subchamber with the lower contact surface 195 thereof facing the pad portion 171 of the detector 170, as shown in FIG. 3. This positions the opening 197 in the position shown in FIGS. 3 and 4.

The upper housing 91 is then positioned in overlaying relation to the lower housing 11 with the annuli 184 of the diaphragms 180 received in the respective recessed annuli 140 of the upper housing and the lower surfaces 142 of the annular ridges 141 disposed in facing engagement with the web portion of each diaphragm, as shown in FIG. 2. When so positioned, the shoulders 185 of the diaphragm are captured by the respective annular ridges 61 of the lower housing and 141 of the upper housing thereby capturing the diaphragms in the position shown in FIG. 2. Similarly, the lower surface of the annulus 184 of each diaphragm forms a fluid tight seal against the upper surface of the electrical conductor portion 174 of each detector 170.

Thereafter, a plurality of bolts 210 are individually extended through the bore holes 31 and 111 of the respective lower and upper housings 11 and 91. Nuts 211 are then individually screw-threadably received on the bolts and tightened into position to mount the upper and lower housings in sealing relation to each other capturing the diaphragms 180 in the positions described.

Figure 8:
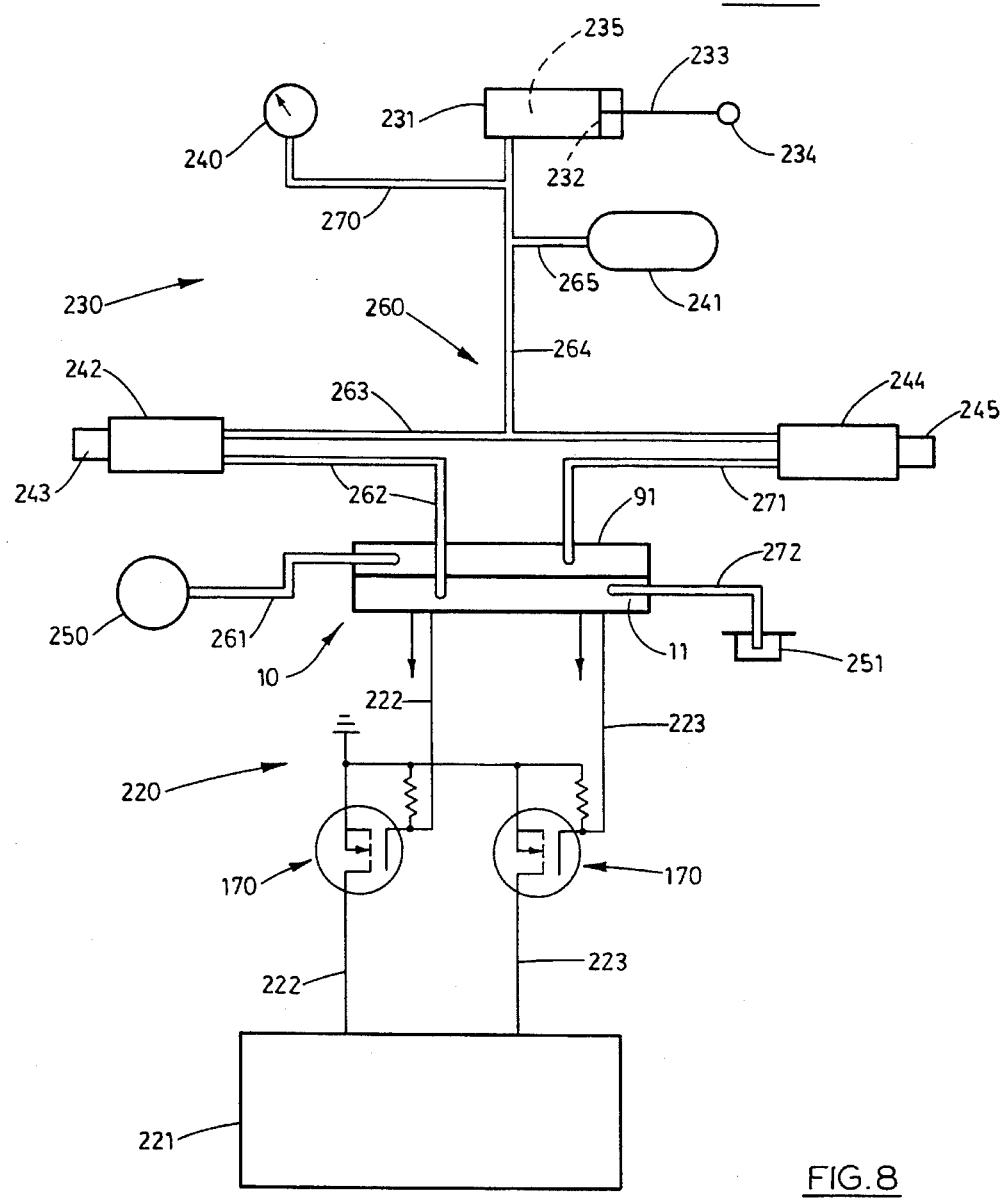
FIG. 8 is a schematic diagram of the sensor of the first embodiment of the present invention depicted in an operative environment relative to a pneumatic exercising machine.

The sensor 10 is shown in FIG. 8 in a typical operative environment illustrative of a multitude of other operable environments within which the sensor can be employed with equal operative advantage. In this illustrative embodiment, an electrical system is generally indicated by the numeral 220. A registering means is generally indicated by the numeral 221. The registering means can be of any suitable type. In the illustrative embodiment, the registering means includes a system for registering the electrical resistance detected by the detectors 170, converting the raw data to the desired form and displaying the information so converted in a readable form. This display can be digital, analog or by any other suitable means readable by an operator. Furthermore, in the preferred embodiment, the registering means is programmed to operate in a normal electrical energy mode and in default, after a predetermined period of time, to a low electrical energy mode. In the normal electrical energy mode the date is displayed for reading by an operator. In the low electrical energy mode, the display systems are deenergized to save electrical energy.

As shown in the schematic diaphragm of FIG. 8, the detectors 170 are depicted, for illustrative convenience, physically outside of the sensor 10 simply for purposes of illustrative convenience. Similarly, the electrical conductors 222 and 223 are respectively shown in the schematic diaphragm pivoted from each other one hundred and eighty degrees (180°) from their actual physical arrangement, again purely for illustrative convenience.

In the schematic diaphragm of FIG. 8, the pneumatic exercising machine is generally indicated by the numeral 230 and has a pneumatic cylinder 231 in which is mounted for slidable movement a piston 232. The piston is mounted on a piston rod 233 which extends outwardly of the pneumatic cylinder and has an exercising member 234 mounted at the distal end thereof. It will be understood that the specific form of pneumatic exercising machine, insofar as the physical movements to be performed thereon as well as the specific structure of the exercising member 234 are merely schematically represented in FIG. 8 and may be of any suitable type in this illustrative embodiment. The pneumatic cylinder 231 houses a pressure chamber 235 between the piston 232 and the distal end of the pneumatic cylinder. The pneumatic exercising machine has a pressure gauge 240 and a pressure reservoir 241. U.S. Pat. No. 4,257,593 can be consulted for purposes of understanding the specific structure and operation of a pneumatic exercising machine, separate and apart from the sensor of the present invention, and is for that purpose incorporated herein by reference.

However, the pneumatic exercising machine 230 has a left or inlet control valve 242 mounting a thumb button 243. The inlet control valve 242 is a normally closed valve operable to be opened by depression of the thumb button 243 by an operator of the pneumatic exercising machine. The pneumatic exercising machine further includes a right or outlet control valve 244 mounting a thumb button 245. The outlet control valve 244 is also a normally closed valve operable to open upon depression of the thumb button 245 by the operator of the pneumatic exercising machine. The pneumatic exercising machine further includes a source of gas under pressure 250 and a discharge 251. In the preferred embodiment the gas is released to atmosphere through the discharge.

The pneumatic exercising machine has a pneumatic system 260 including a pneumatic conduit 261 operatively interconnecting the source of gas under pressure 250 and the coupling 153 on the left as viewed in FIG. 1. A pneumatic conduit 262 operatively interconnects the coupling 73 on the left as viewed in FIG. 1 and the inlet control valve 242. A pneumatic conduit 263 operatively interconnects the inlet control valve 242 and the outlet control valve 244. A pneumatic conduit 264 operatively interconnects pneumatic conduit 263 and the pressure chamber 235 of the pneumatic cylinder 231. A pneumatic conduit 265 operatively interconnects the pneumatic conduit 264 and the pressure reservoir 241. A pneumatic conduit 270 operatively interconnects pneumatic conduit 264 and the pressure gauge 240. Pneumatic conduit 271 operatively interconnects the outlet control valve 244 and the coupling 153 on the right, as viewed in FIG. 1. Pneumatic conduit 272 operatively interconnects the coupling 73 on the right, as viewed in FIG. 1, and the discharge 251.

For illustrative convenience, it will be understood that, in one embodiment of the pneumatic exercising machine 230, the inlet control valve 242 is mounted adjacent to one end of the exercising member 234 and the outlet control valve 244 is mounted adjacent to the other end of the exercising member 234. Thus, an operator exercising against the pneumatic resistance force provided by the pneumatic exercising machine can grasp the exercising member in moving it along a predefined path of travel. Upon depression of the thumb button 243 of the inlet control valve 242, the operator can supply pressurized gas from the source of gas under pressure 250 through the sensor 10, the inlet control valve and into the pressure chamber 235 of the pneumatic cylinder 231 to increase gas pressure therewithin and thereby increase the resistance force applied by the pneumatic exercising machine against movement of the exercising member 234. Conversely, the operator can depress the thumb button 245 of the outlet control valve 244 to release gas under pressure from the pressure chamber 235 through the outlet control valve 244, the sensor 10 and the pneumatic conduit 272 through the discharge 251. This operation reduces the pneumatic resistance force applied against movement of the exercising member 234. This operation of the inlet and outlet control valves can be performed at anytime including during movement of the exercising member 234. In general, the operation of such inlet and outlet control valves operable by thumb buttons is known in the art relative to pneumatic exercising machines. This is not, of course, true with respect to the sensor 10 and 310 of the present invention.

SECOND EMBODIMENT

Figure 7:
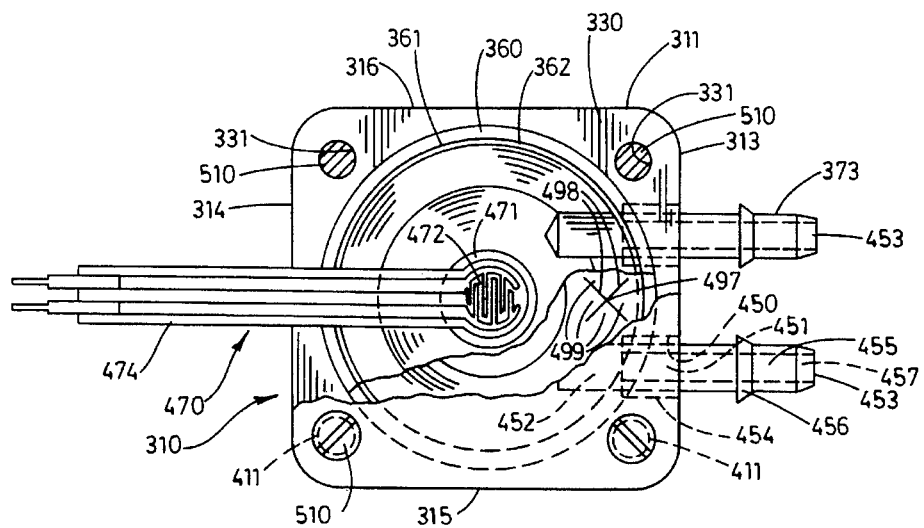
FIG. 7 is a fragmentary top plan view of the sensor of the second embodiment of the present invention.

The sensor of the second embodiment of the present invention is generally indicated by the numeral 310 and is shown in FIGS. 5, 6 and 7. The sensor 310 has a first or lower housing 311 which, as with the sensor 10 of the first embodiment of the present invention, can be constructed of any suitable material including metal, any of a variety of plastic materials or any other suitable material. The lower housing has a lower surface 312 which defines a flat plane, except as otherwise set forth herein. The lower housing has a flat front surface 313 defining a plane right-angularly related to the lower surface. The lower housing has a back surface 314 right-angularly related to the lower surface 312 and parallel to the front surface 313. The lower housing has a left end surface 315, as depicted in FIG. 5, and a right end surface 316, as depicted in FIG. 5. The end surfaces are flat, right-angularly related to the lower surface 312 and parallel to each other. A depression 317 is formed in the lower surface 312 of the lower housing.

The lower housing 311 has a parting or upper surface 330 which defines a flat plane parallel to the lower surface 312 of the lower housing, except as otherwise described herein. A plurality of bore holes 33 1 extend through the lower housing from the upper surface 330 through the lower surface 312 in any suitable pattern, such as depicted in FIGS. 5 and 7.

The lower housing 311 has a lower subchamber 340 defined by cylindrical sidewall 341 which is concentric to a longitudinal axis which is, in turn, right-angularly related to the lower surface 312 of the lower housing. The lower subchamber has a lower surface 342 which is right-angularly related to the longitudinal axis described by the cylindrical sidewall. A projection 343 extends upwardly from the lower surface 342 concentric to the longitudinal axis described by the cylindrical sidewall and has a conical surface 344 extending thereabout. The projection has a flat upper surface 345 defining a plane parallel to the lower surface 342 of the lower subchamber.

A recessed annulus 360 is formed in the upper surface 330 of the lower housing 311 concentric to the longitudinal axis defined by the cylindrical sidewall 341. The recessed annulus 360 is separated from the lower subchamber by an annular ridge 361 extending about the lower subchamber between the recessed annulus and the lower subchamber. The annular ridge has an upper surface 362 which is parallel to the lower surface 342 of the lower subchamber and is recessed a short distance from the upper surface 330 of the lower housing. A slot 363 is formed in the upper surface 330 of the lower housing extending along a path, as shown in FIG. 6, from the lower subchamber through the annular ridge, recessed annulus and outwardly through the back surface 314 of the lower housing along a path parallel to the lower surface 342 of the lower subchamber 340.

A screw threaded bore 370 extends through the front surface 313 of the lower housing 311 and into communication with the lower subchamber 340 along a path offset relative to the longitudinal axis described by the cylindrical sidewall 241. The screw threaded bore defines a passage 371 which communicates with the lower subchamber through an opening 372. A coupling 373, having an externally screw threaded end portion 374, is screw-threadably received in the screw threaded bore 370 in fluid tight relation. The coupling has a conduit fastening portion 375 extending outwardly from the front surface 313 of the lower housing 311. A radial ridge 376 extends about the conduit fastening portion. The coupling has a central passage 377 which establishes fluid communication therethrough between the lower subchamber 340 and the exterior of the sensor 310.

The sensor 310 has a second or upper housing 391 constructed of any of the same materials heretofore described relative to the lower housing 311. As in the case of the sensor 10, the upper housing 391 is preferably constructed from the same mold as the lower housing 311. The upper housing 391 has an upper surface 392 which describes a flat plane, except as otherwise noted herein. The upper housing has a flat front surface 393 right-angularly related to the upper surface 392. The upper housing has a back surface 394 right-angularly related to the upper surface 392 and parallel to the front surface 393. The upper housing has a left end surface, as depicted in FIG. 5, and a right end surface 396, as depicted in FIG. 5. A depression 397 extends into the upper surface 392, as best shown in FIG. 5. The upper housing 391 has a parting or lower surface 410 which defines a flat plane, except as otherwise noted herein, parallel to the upper surface 392 of the upper housing. A plurality of bore holes 411 extend through the upper housing from the upper surface through the lower surface 410 in the same pattern as the bore holes 331 of the lower housing 311.

The upper housing 391 has an upper subchamber 420 defined by a cylindrical sidewall 421 concentric to a longitudinal axis which is right-angularly related to the upper surface 392 of the upper housing 391. The upper subchamber is defined at its inwardly extending extremity by an upper surface 422 which, accept as otherwise noted herein, defines a plane right-angularly related to the longitudinal axis defined by the cylindrical sidewall 421. A projection 423 extends downwardly from the upper surface concentric to the longitudinal axis defined by the cylindrical sidewall and has a conical surface 424. The projection has a flat lower surface 425 defining a plane right-angularly related to the longitudinal axis defined by the cylindrical sidewall 421.

A recessed annulus 440 is formed in the lower surface 410 of the upper housing 391 extending about the upper subchamber concentric to the longitudinal axis defined by the cylindrical sidewall 421. An annular ridge 441 extends about the upper subchamber between the upper subchamber and the recessed annulus concentric to the longitudinal axis defined by the cylindrical sidewall 421. The annular ridge has a lower surface 442 which is recessed from the plane defined by the lower surface 410 of the upper housing 391 and defines a plane parallel to the upper surface 422 of the upper subchamber 420. A slot 443 extends from the upper subchamber 420 through the back surface 394 of the upper housing 391 along a course parallel to the upper surface 422 of the upper subchamber 420.

A screw threaded bore 450 extends inwardly of the upper housing 391 from the front surface 393 thereof into communication with the upper subchamber 420. The screw threaded bore defines a passage 451 interconnecting the exterior of the upper housing and the interior of the upper subchamber communicating with the upper subchamber through an opening 452. A coupling 453, having an externally screw threaded end portion 454, is screw-threadably received in the screw threaded bore 450 in fluid right relation. The coupling has a conduit fastening portion 455, best shown in FIG. 7, having a radial ridge 456 extending thereabout. A central passage 457 extends through the coupling 453 to establish fluid communication between the upper subchamber and the exterior of the sensor 310.

A pair of detectors, pressure sensitive switches or force sensing resistors 470 are individually mounted in the respective lower subchamber 340 and the upper subchamber 420. As with the sensor 10, the detectors can be of any suitable type, but a force sensing resistor sold by Interlink Electronics and identified as part number "300 (⅕ inch circle)" has been found well suited to the purpose. Each detector has a pad portion 471 having a flat contact surface 472 and an opposite flat mounting surface 473. An electrical conductor portion 474 extends from the pad portion of the detector, as shown in FIGS. 5, 6 and 7. Each of the detectors 470 is mounted on one of the projections 343 or 423. In the case of the detector mounted on projection 343, the mounting surface 473 of the detector is adhesively mounted on the flat upper surface 345 of the projection concentric to the longitudinal axis defined by the cylindrical sidewall 341. In the case of the projection 423, the mounting surface 473 of its respective detector is adhesively mounted on the lower surface 425 of the projection 423. This is best shown in FIG. 6. As also shown in FIG. 6, the electrical conductor portions 474 of the detectors 470 extend through their respective slots 363 and 443.

A pressure responsive member or diaphragm 480 substantially identical to those of the sensor 10, is mounted within the sensor 310, also as best shown in FIG. 6. The diaphragm is constructed of a resilient rubber, synthetic rubber material or any other suitable material allowing it to flex. The diaphragm has an upper surface 480 and an opposite lower surface 482. The diaphragm has a cylindrical peripheral surface 483. Just inwardly of the peripheral surface 483, an annulus 484 extends about the diaphragm. The annulus in cross section is substantially square so as to form an inwardly facing shoulder 485. The diaphragm has a thickened central portion 486 concentric to the annulus 484 and connected to the annulus 484 by a web portion 487 of thinner, but solid material, except as hereinafter noted.

More specifically, the diaphragm 480 has a lower contact surface 495 of the thickened portion 486 which is flat and parallel to the plane defined by the plane of the diaphragm. Similarly, the thickened central portion of the diaphragm has an upper contact surface 496 which is circular and is parallel to the lower contact surface 495. A passage or opening 497 is formed in the web portion 487 of the diaphragm by intersecting incisions or slits 498, visible in FIGS. 6 and 7. The incisions intersect at right angles relative to each other to define four flaps 499. As noted relative to the diaphragm 180 of the first embodiment, the opening 497 can be formed in a variety of different forms, but the form hereof is preferred. All of the comments made heretofore relative to the diaphragm 180 apply to the diaphragm 480.

The diaphragm is mounted on the lower housing 311 by positioning the annulus 484 of the diaphragm within its recessed annulus 360 of the lower housing so that the web portion 487 is rested on and extends over the upper surface 362 of the annular ridge 361 and with the thickened central portion 486 of the diaphragm extending across the lower subchamber 340. The lower contact surface 495 thereof is oriented to face the pad portion 471 of the detector 470, as shown in FIG. 6. This positions the opening 497 of the diaphragm in the position shown in FIGS. 6 and 7.

The upper housing 391 is then positioned in overlaying relation to the lower housing 311 with the annulus 484 of the diaphragm 480 received in the recessed annulus 440 of the upper housing and the lower surface 442 of the annular ridge 441 disposed in facing engagement with the web portion of the diaphragm, as shown in FIG. 6. When so positioned, the shoulders 485 of the diaphragm are captured by the respective annular ridges 361 of the lower housing and 441 of the upper housing and thereby capturing the diaphragm in the position shown in FIG. 6. As also visualized therein, the annulus 484 forms a fluid tight seal against the electrical conductor portions 474 of the detectors 470 whereby the upper and lower subchambers form a single, fluid tight chamber with the diaphragm extending thereacross and with fluid passage into or from the chamber so formed possible only through the couplings 373 and 453. If desired, the slots 363 and 443 can be sealed by a suitable sealant outwardly of the peripheral surface 483 of the diaphragm without in any way adversely affecting operation of the sensor 310.

Thereafter, a plurality of bolts 510 are individually extended through the bore holes 331 and 411 of the respective lower and upper housings 311 and 391. Nuts 511 are individually screw-threadably received on the bolts and tightened into position to mount the upper and lower housings in sealing relation to each other capturing the diaphragm 480 in the position described.

OPERATION

The operation of the described embodiment of the subject invention is believed to be readily apparent and is briefly summarized at this point.

For purposes of illustrative convenience, the operation of the sensor 10 of the present invention will serve as a starting point for describing the operation of the present invention. In this regard, reference to FIG. 8 may be of assistance in visualizing operation of the sensor 10. In the operative environment shown therein, and is previously described, the operator can adjust the pneumatic resistance force against which he or she will work. This, as previously described, is achieved by operation of the inlet control valve 242 or outlet control valve 244. Depression of the thumb button 243 of the inlet control valve 242 increases pneumatic resistance by causing gas under pressure to pass from the source of gas under pressure 250 through the sensor 10 and into the pressure chamber 235 of the pneumatic cylinder 231. Conversely, depression of the thumb button 245 of the outlet control valve 244 causes gas under pressure to be released from the pressure chamber 235 of the pneumatic cylinder along the pneumatic system 260 and from the discharge 251. This reduces the pneumatic resistance force as described.

The passage of gas under pressure through the inlet control valve 242 to or from the pressure chamber 235 causes gas under pressure to pass through the opening 197 of the diaphragm 180 on the left, as viewed in FIG. 2. Pressurized gas in passing to or from the pressure chamber 235 of the pneumatic cylinder 231 through the outlet control valve 244 causes pressurized gas to pass through the opening 197 of the diaphragm 180 on the right, as viewed in FIG. 2. Such movement of pressurized gas, in either case, creates a pressure differential across the diaphragm.

More specifically, in reference to the diaphragm 180 on the left as viewed in FIG. 2, the pressure within the first subchamber 120 is greater than the pressure within the first subchamber 40 as pressurized gas moves through the sensor in the direction of the pressure chamber 235. This pressure differential across the diaphragm causes gas under pressure to be forced through the opening 197 of the diaphragm from the first subchamber 40 into the first subchamber 120. Depending upon the magnitude pressure differential, the slits 198 are caused to open in that the flaps 199 are forced downwardly, as viewed in FIG. 2, into the first subchamber 40 to cause the area of the opening 197 to expand and thereby allow gas under pressure more rapidly to pass therethrough. Nonetheless, the resiliency of the diaphragm and the accommodation provided by the slits 198 are limited so that the diaphragm itself flexes, or bows downwardly into the subchamber 40 until the lower contact surface 195 engages and applies pressure to the upper surface 172 of the pad portion 171 of the detector 170. At very low pressure differentials there may be little or no flow of gas through the opening and yet the diaphragm flexes downwardly to cause such contact with the detector. This allows such detection to take place.

However, at higher, or normal, pressure differentials, simultaneously, gas under pressure passes through the opening 197. Thus, referring to FIG. 8, when gas under pressure is moving toward the pressure chamber 235 of the pneumatic cylinder 231 by depression of the thumb button 243 of the inlet control valve 242, pressure is applied to the detector 170 on the left, as viewed in FIG. 2. When pressure is applied to the detector 170 in the manner described, by the diaphragm thereby exerting pressure on the pad portion 171 thereof, this creates a variation in electrical resistance detected by the registering means 221. This indicates to the registering means that gas under pressure is moving in the direction of the pressure chamber 235 of the pneumatic cylinder from the source of gas under pressure 250. Since the electrical resistance varies with the amount of pressure applied to the pad portion 171 of the detector 170, the rate of movement of gas under pressure in the detected direction can be calculated and displayed by the registering means as well. Since the area of the opening 197 can be calculated for a particular rate of flow, the volume of pressurized gas can be calculated and displayed by the registering means. While these capabilities are present in the manner described and while they may be of benefit and desirable, the manufacturer of the pneumatic exercising machine can choose to have a registering means capable of providing this information or not consistent with cost and the desired result.

In any case, at very least, the detector 170 operates to indicate when the usage of the exercising machine is desired. This is because the depression of the thumb button 243 of the inlet control valve 242 causes the pressure differential across the diaphragm 180 on the left as viewed in FIG. 2 to create the pressure differential causing the diaphragm to exert pressure against the detector 170. The registering means detects such activity and is operable to convert the display means of the registering means from the lower electrical energy mode to the normal electrical energy mode. This causes the display visible to the operator to be activated and displays the data desired for operation of the pneumatic exercising machine.

Similarly, depression of the thumb button 245 of the outlet control valve 244 causes the diaphragm 180 on the right, as viewed in FIG. 2 to be flexed into engagement with the detector 170 thereof to create the variation in electrical resistance detected by the registering means. This similarly allows the registering means immediately to convert the pneumatic resistance display system from a lower electrical energy mode to the normal electrical energy mode. As a result, when an operator is ready to operate the pneumatic exercising machine, the pneumatic resistance display system is activated simply by depressing either the thumb button 243 of the inlet control valve 242 or the thumb button 245 of the outlet control valve 244.

In the case of the sensor 310 of the second embodiment of the present invention, the single diaphragm 480 performs in exactly the same manner as described with the diaphragms 180 of the sensor 10 of the first embodiment of the invention. However, in the case of the sensor 310, such data as direction of flow, rate of flow, volume of flow and, more simply, activity, are registrable in both directions within the single chamber composed of lower and upper subchambers 340 and 420, respectively. Thus, as viewed in FIG. 6, a pressure differential across the diaphragm 480, wherein there is greater pressure in the upper subchamber 420 than in the lower subchamber 340, causes the lower contact surface 495 of the diaphragm 480 to apply pressure to the contact surface 472 of the detector 470 within the lower subchamber 340. Conversely, when the pressure differential across the diaphragm is caused by greater pressure within the lower subchamber 430 than in the upper subchamber 420, the upper contact surface 496 applies pressure to the contact surface 472 of the detector 470 in the upper subchamber 420. As previously described, such contact creates a variation in electrical resistance in the electrical conductor portions 474 which can be sensed by any suitable means, such as that depicted in FIG. 8 and described heretofore relative to sensor 10 of the first embodiment of the present invention. However, the sensor 310, as with sensor 10, can be employed in virtually any environment.

Both sensors 10 and 310 are extremely sensitive to even the smallest pressure differential or flow of a fluid therethrough because at very low pressure differentials across the diaphragm 180 and 480, the openings 197 and 497, respectively, are, in effect, closed by the flaps 199 and 499 thereof. This permits the diaphragm to be flexed under very small pressure differentials and such movement to be sensed by contact with the detectors. As the pressure differential increases, the flaps begin to be forced from each other to allow the opening to permit flow therethrough from one subchamber to the other, as heretofore described.

Therefore, the sensor of the present invention rapidly and accurately provides desired data; can be employed to provide, in a continuous mode of operation, data of a plurality of types; while providing the detailed data desired, continuously so performs at significantly less expense than has heretofore been possible with prior art sensors; is virtually universally adaptable to a host of different operative environments to perform its operational objectives while, in all cases, being of significantly less expense than prior art sensors; is readily adaptable for performance in accordance with the criteria required for this specific environment of usage; and is particularly well suited to registering and providing data for exercising machines, particularly of the pneumatic type.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. A sensor comprising a housing enclosing a passage; a diaphragm mounted on the housing within said passage for movement upon the application of a pressure differential thereacross within said passage; and means operably connected to the housing for registering said movement of the diaphragm to detect said pressure differential and wherein said pressure differential is caused by fluid within said passage and in which an opening extends through the diaphragm operable to permit movement of the fluid along said passage through the opening whereby said movement of the diaphragm, as registered by the registering means, serves to detect the flow of said fluid along the passage.

2. The sensor of claim 1 wherein said opening is formed by an incision in the diaphragm which expands in response to an increase in the pressure differential across said diaphragm.

3. The sensor of claim 2 wherein said incision is formed by a pair of intersecting incisions in the diaphragm forming said opening bounded by a plurality of flap portions in said diaphragm movable from each other upon said increase in the pressure differential so as to increase the area of said opening for movement of the fluid through the opening.

4. A sensor comprising a housing enclosing a passage; a diaphragm mounted on the housing within said passage for movement upon the application of a pressure differential thereacross within said passage; and means operably connected to the housing for registering said movement of the diaphragm to detect said pressure differential and wherein said registering means includes a pressure sensitive switch operable to produce a variation in electrical resistance in response to the pressure applied to the pressure sensitive switch and said diaphragm has a portion engageable with said pressure sensitive switch for the transmission of pressure from the diaphragm to the pressure sensitive switch.

5. The sensor of claim 4 wherein said registering means includes an electrical system operably connected to said pressure sensitive switch operable to register said electrical resistance to detect movement of the fluid along said passage.

6. The sensor of claim 5 wherein said registering means includes means for measuring said electrical resistance as an index of movement of the fluid along said passage.

7. The sensor of claim 6 including means for recording said electrical resistance measured by the registering means.

8. The sensor of claim 6 including an opening in said diaphragm operable to permit movement of the fluid along said fluid passage through the diaphragm.

9. The sensor of claim 8 wherein said opening is formed by an incision in the diaphragm operable to open in response to the pressure differential across the diaphragm.

10. The sensor of claim 9 in which the diaphragm is resilient and wherein said incision is formed by intersecting incisions so as to form flap portions of the diaphragm disposed substantially in a common plane closing said opening when there is substantially no pressure differential across said diaphragm and resiliently deformable to open in response to and in correlation with the magnitude of a pressure differential applied across the diaphragm.

11. A sensor comprising:

A. a housing enclosing a chamber for fluid;

B. a diaphragm, deformable under pressure, mounted on the housing extending through said chamber to divide the chamber into two substantially discrete subchambers;

C. two couplings mounted on the housing in individual fluid communication with said subchambers and adapted individually to be connected in fluid communication with at least one fluid system housing fluid under pressure;

D. at least one detector mounted on the housing in at least one of said subchambers in a predetermined position to detect deformation of said diaphragm in response to fluid pressure; and E. means operably connected to the detector for registering said deformation of the diaphragm to indicate a differential in fluid pressure within said subchambers.

12. The sensor of claim 11 wherein said detector is electrical and operable upon contact with said detector to create a variation in electrical resistance registrable by said registering means to indicate said differential in fluid pressure.

13. The sensor of claim 12 wherein said detector creates said variation in electrical resistance in a magnitude substantially related to the amount of pressure applied to the detector by said contact with the diaphragm registrable by said registering means substantially to indicate the magnitude of said differential in fluid pressure.

14. The sensor of claim 13 wherein a detector is mounted on the housing in each of said subchambers individually in a predetermined position individually to detect deformation of said diaphragm within its respective subchamber upon deformation of said diaphragm within its respective subchamber in response to fluid pressure.

15. The sensor of claim 13 wherein said detector is a force sensing resistor mounted on the housing in the subchamber in said predetermined position and said diaphragm mounts a surface in substantial alignment with said force sensing resistor for engagement with the force sensing resistor to apply said contact upon said deformation of the diaphragm.

16. The sensor of claim 12 wherein a passage extends through the diaphragm establishing fluid communication between said subchambers whereby a pressure differential between the fluids in the respective subchambers causes said deformation in the diaphragm while fluid passes through said passage from the subchamber of comparatively higher pressure into the subchamber of comparatively lower pressure to create said variation in electrical resistance registrable by said registering means to indicate said differential in fluid pressure and, as a consequence, the direction of fluid flow.

17. The sensor of claim 16 wherein said registering means registers the magnitude of the variation in electrical resistance created by said detector and, as a consequence, substantially the magnitude of fluid flow in said direction.

18. The sensor of claim 17 wherein said passage in the diaphragm is formed by intersecting slits in said diaphragm and the diaphragm is resilient so that, when the diaphragm is under said deformation, the passage formed by said intersecting slits expands to define a passage of increasing area in correlation with increasing deformation of the diaphragm as a result of increasing pressure differential between said subchambers.

19. The sensor of claim 18 wherein said intersecting slits are formed substantially without removal of material from the diaphragm so that said diaphragm, when not deformed, substantially seals said subchambers from each other by closing said passage.

20. The sensor of claim 18 wherein said intersecting slits define flaps in the diaphragm bounding said passage which, upon the application of said pressure differential across the diaphragm causing said deformation of the diaphragm, are moved from each other to expand the area of the diaphragm defined by the flaps in substantial correlation with the increase in said pressure differential.

21. The sensor of claim 16 wherein said housing has a pair of said substantially fluid tight chambers; a diaphragm, deformable under pressure, mounted on the housing extending through each of said fluid chambers to divide each fluid chamber into two substantially discrete subchambers; two couplings mounted on the housing in individual fluid communication with the subchambers of the fluid tight chamber of said pair of said substantially fluid tight chambers and adapted individually to be connected in fluid communication with at least one fluid system having internal fluid under pressure; at least one detector mounted in at least one of said subchambers of each fluid tight chamber in a predetermined position individually to detect deformation of said diaphragm in response to fluid pressure and said registering means is operably connected to both detectors for individually registering the deformation of said diaphragms individual to said fluid tight chambers individually to indicate differentials in fluid pressure within the subchambers of each fluid tight chamber.

22. The sensor of claim 16 wherein said detector includes a force sensing resistor operable to vary the electrical resistance produced by the force sensing resistor substantially in correlation with an increase in the physical pressure applied to the force sensing resistor and to vary the electrical resistance produced by the force sensing resistor substantially in correlation with a reduction in the physical pressure applied to the force sensing resistor and said registering means registers said variation in electrical resistance and indicates by indicia the direction and substantially the rate of said fluid flow in said direction.

23. The sensor of claim 16 wherein said fluid system is a pneumatic system, having a pressurized gas within the pneumatic system, of a pneumatic exercising apparatus having an exercising member engageable by an operator for movement along a path of travel, a pneumatic cylinder operably connected to said exercising member and having an internal gas chamber operably connected to said pneumatic system in fluid communication with said pressurized gas of the pneumatic system whereby movement of said exercising member in a predetermined direction causes an increase in the pressure of the pressurized gas in said pneumatic cylinder to resist said movement of the exercising member.

24. The sensor of claim 23 including a source of pressurized gas, means operably interconnecting the pneumatic system and said couplings of the housing for admitting pressurized gas to and alternatively releasing pressurized gas from said gas chamber of the pneumatic cylinder to increase, or alternatively decrease, the resistance to exercising and said source of pressurized gas, housing, means for admitting, and alternatively releasing, pressurized gas and the gas chamber of the pneumatic cylinder are interconnected in said pneumatic system in series relation whereby operation of said means for admitting, or alternatively releasing, pressurized gas causes said pressure differential within subchambers of the housing.

25. The sensor of claim 24 wherein said pneumatic exercising apparatus has an electrical pneumatic resistance display system, operable to register the pneumatic resistance provided to movement of said exercising member, powered by electrical energy and programmed to operate in a low electrical energy mode and a normal electrical energy mode, and said registering system is operably connected to the pneumatic resistance display system to switch said pneumatic resistance display system to said normal energy mode upon registering said pressure differential.

26. The sensor of claim 25 wherein said means for admitting and alternatively releasing includes a normally closed valve operable to be opened by an operator of the pneumatic exercising apparatus to change the pressure of said gas in the pneumatic system and said pneumatic system interconnects in series relation said gas chamber of the pneumatic cylinder, the normally closed valve and one of said two couplings of the housing and the other one of said two couplings of the housing is connected to a source of a gas under pressure whereby, when said normally closed valve is opened, gas is caused to flow from the source of gas under pressure through the sensor, the normally closed valve and into said gas chamber of the pneumatic cylinder and said registering means switches the pneumatic resistance display system to said normal energy mode.

* * * * *